United States Patent [19]
Snell

[11] Patent Number: 5,588,514
[45] Date of Patent: Dec. 31, 1996

[54] STEERING COLUMN MECHANICAL BRAKE INTERLOCK SYSTEM

[75] Inventor: William M. Snell, Grand Blanc, Mich.

[73] Assignee: Chrysler Corporation, Auburn Hills, Mich.

[21] Appl. No.: 442,246

[22] Filed: May 15, 1995

[51] Int. Cl.$^6$ .................................................. B60K 41/26
[52] U.S. Cl. .......................... 192/4 A; 74/483 R; 477/96; 70/248
[58] Field of Search ................... 477/96, 99; 74/473 SW, 74/475, 483 R; 192/4 A; 70/247, 248

[56] References Cited

U.S. PATENT DOCUMENTS

| | | | |
|---|---|---|---|
| 4,821,605 | 4/1989 | Dzioba. | |
| 4,905,802 | 3/1990 | Gotoh | 192/4 A |
| 4,932,283 | 6/1990 | Ishigami et al. | 477/99 X |
| 4,936,431 | 6/1990 | Shinpo | 192/4 A |
| 5,027,929 | 7/1991 | Radke et al. | 192/4 A |
| 5,299,470 | 4/1994 | Snell et al. . | |
| 5,511,641 | 4/1996 | Snell et al. | 192/4 A |

OTHER PUBLICATIONS

U.S. patent application Ser. No. 08/343,052 filed Nov. 21, 1994.

*Primary Examiner*—Richard M. Lorence
*Attorney, Agent, or Firm*—Edward A. Craig

[57] ABSTRACT

A steering column-mounted shift control assembly includes a rotatably mounted shift lever unit, a shift handle pivotally mounted on the shift lever unit, and a spring for urging the terminal end of the shift handle toward a planar gate unit having Park, Reverse, Neutral, Drive, Second and Low detents formed thereon for selective cooperation with the spring-loaded shift handle terminal end to select a desired transmission shift position. A mechanical brake interlock system cooperates between a foot brake lever and a blocker member pivotally mounted adjacent the terminal end of the shift handle adapted to prevent pivoting of the blocker member away from the terminal end to thus prevent movement of the terminal end of the shift handle out of the Park detent position prior to depression of the commonly used brake pedal and its associated brake lever.

4 Claims, 4 Drawing Sheets

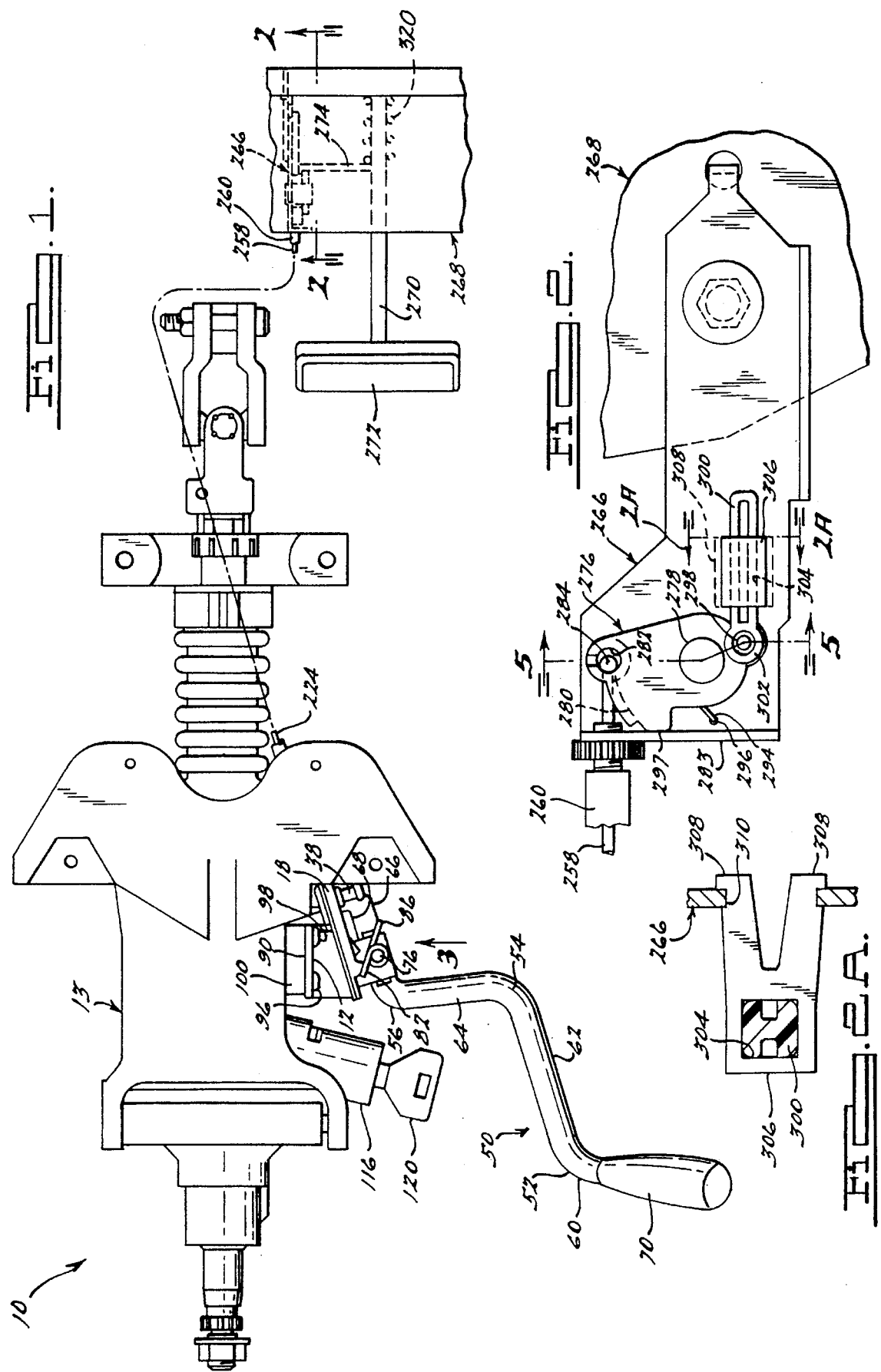

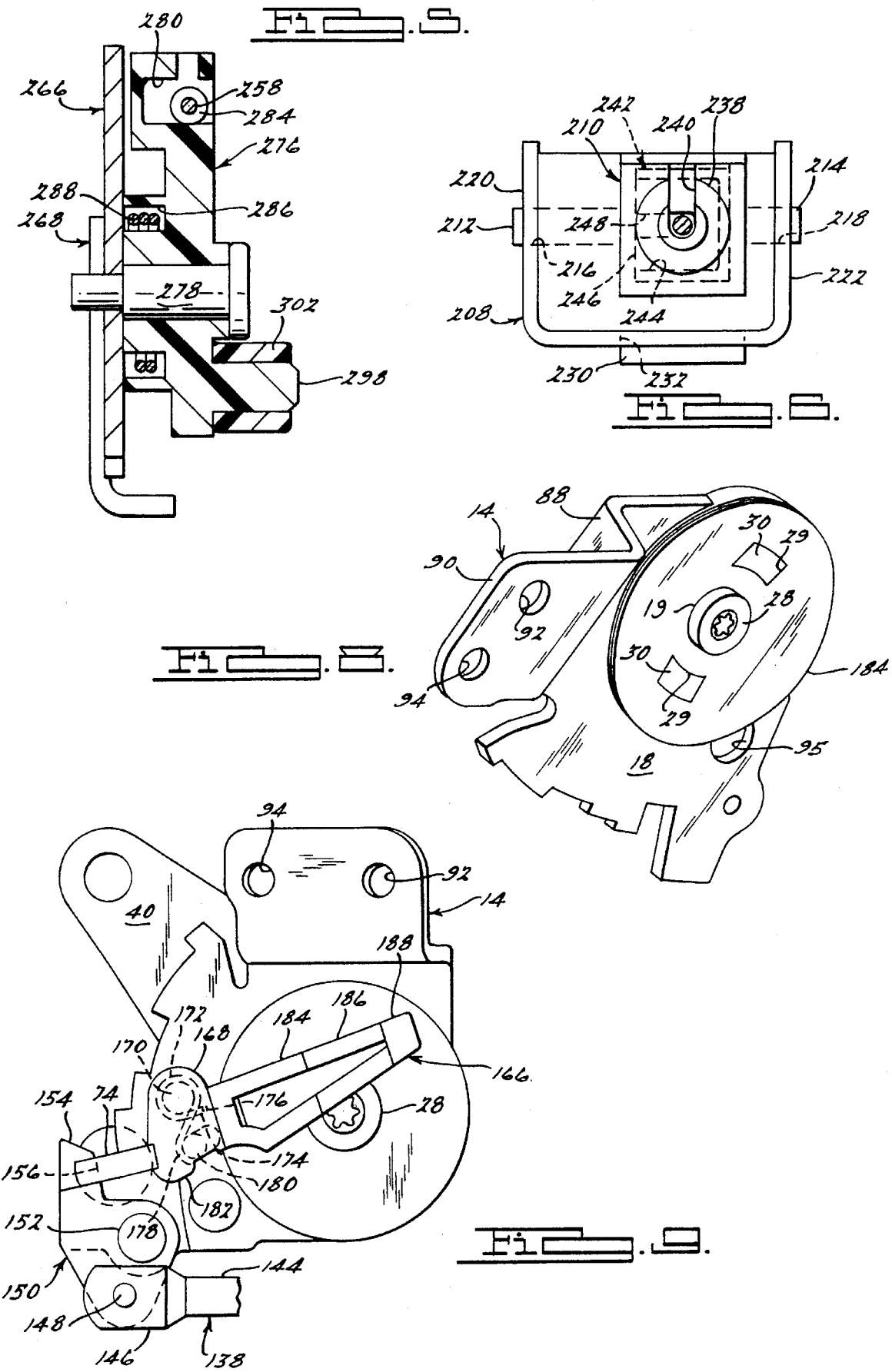

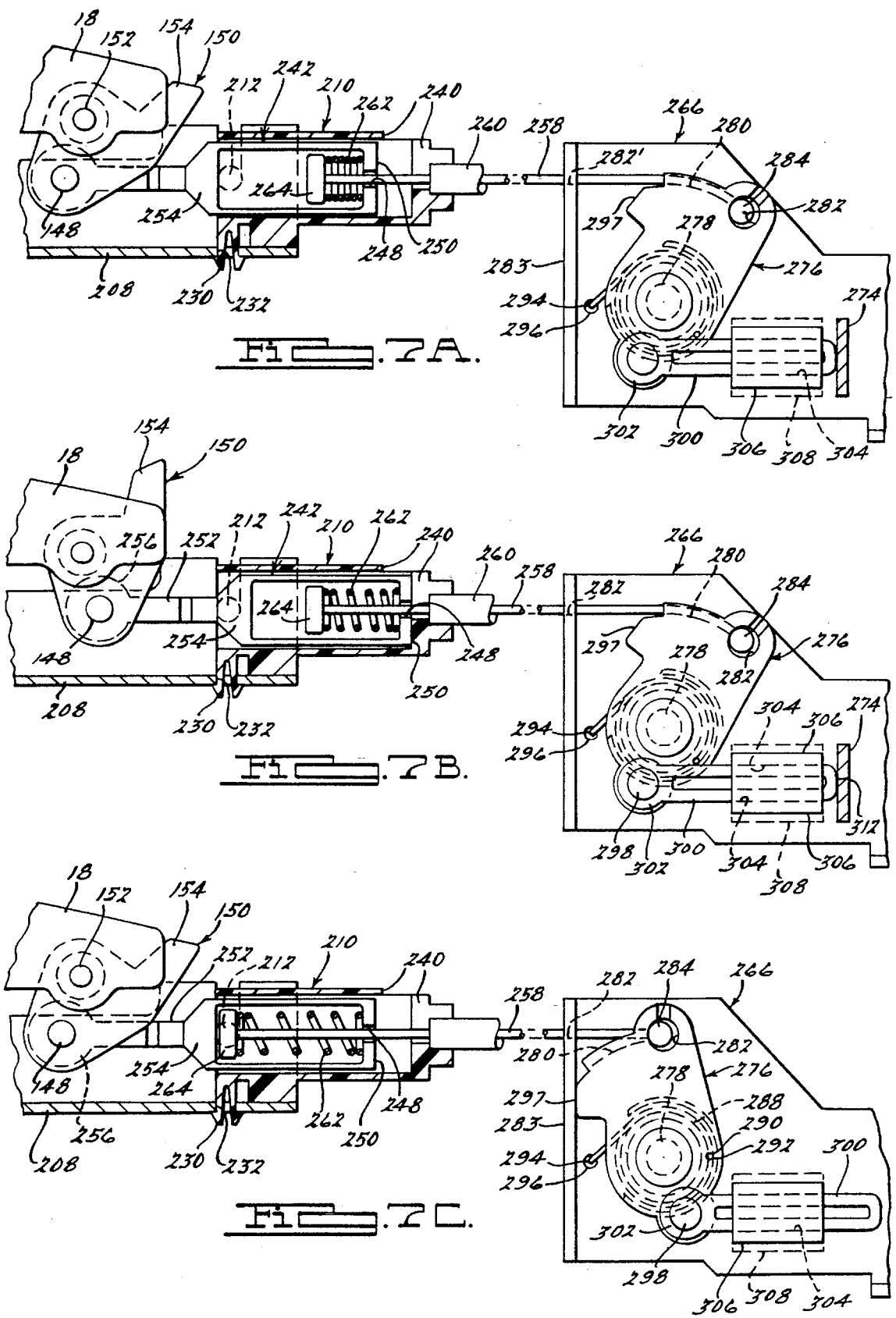

5,588,514

STEERING COLUMN MECHANICAL BRAKE INTERLOCK SYSTEM

TECHNICAL FIELD

This invention relates generally to vehicle transmission steering column-mounted shift control assemblies and, more particularly, to a mechanical brake interlock system therefor.

BACKGROUND ART

A known ignition interlock mechanism for a column-mounted shift control assembly is disclosed in Dzioba U.S. Pat. No. 4,821,605. This mechanism includes a latch plate pivotally mounted on an end of an arcuate shaped detent plate. The latch plate has a locking surface which is selectively positioned via the interaction of a key cylinder slot, a lock pin, a ramped plunger, and a cable to prevent removal of an operator lever positioning arm from the Park position prior to the key cylinder being unlocked. The latch plate also includes a positioning surface which, when engaged by the positioning arm upon its return to Park position, will pivot the latch plate to thereby move the plunger and permit the lock pin to leave the key cylinder slot and permit the key to be returned to its lock and remove position.

A further known ignition interlock mechanism for a column-mounted shift control assembly is disclosed in Snell et al U.S. Pat. No. 5,299,470. This mechanism cooperates with the terminal end of the shift handle to prevent its movement out of the Park detent position unless the ignition switch key is turned on, and further prevents the ignition switch from being turned on, and further prevents the ignition switch from being turned back to Lock unless the terminal end is in Park position, thus preventing key extraction.

A still further ignition interlock mechanism for a column-mounted shift control assembly is disclosed in Snell patent application, Ser. No. 08/343,052, filed on Nov. 21, 1994, now U.S. Pat. No. 5,511,641, issued Apr. 30, 1996. This mechanism includes a disc arrangement formed on the end of the brake lever opposite the brake pedal for receiving the brake cable from a spring biased blocker member for serving to prevent removal of the blocker member from the shift control lever in its park position prior to the depression of the brake pedal.

DISCLOSURE OF THE INVENTION

A general object of the invention is to provide an improved mechanical brake interlock system for a steering column-mounted vehicle transmission shift control assembly, serving to prevent removal of the shift control mechanism from its Park position prior to the depression of the brake pedal.

Another object of the invention is to provide a mechanical brake interlock system for a steering column-mounted vehicle transmission shift control assembly including a rotatably mounted shift lever unit, a shift handle pivotally mounted on the shift lever unit, resilient means for urging the terminal end of the shift handle toward a planar gate unit having Park, Reverse, Neutral, Drive, Second and Low detents formed thereon for selective cooperation with the spring-loaded shift handle terminal end to select a desired transmission shift position, a blocker member pivotally mounted adjacent the terminal end of the shift handle, and a spring-loaded cable arrangement between the blocker member and an actuator assembly engaged by the usual brake pedal lever in its undepressed position to prevent movement of the terminal end of the shift handle out of the Park detent position until the brake pedal is depressed.

A further object of the invention is to provide such a mechanical brake interlock system incorporating a brake cable operative between modular mechanisms at each end thereof operatively connected to the respective blocker member and brake lever.

Still another object of the invention is to provide a mechanical brake interlock system for a steering column-mounted shift control assembly, wherein the interlock system includes a fixed retainer member and a spring-loaded connector member slidably mounted in the fixed retainer and connected to a blocker member serving to block the usual shift control lever in its park position until the brake pedal is depressed; and a spring-loaded, pivotally mounted actuator member and a linkage member connected between the actuator member and the brake lever while the latter is in its rest position; and a cable connected between the spring loaded actuator member and the spring loaded connector member.

These and other objects and advantages will become more apparent when reference is made to the following drawings and the accompanying description.

BRIEF DESCRIPTION OF THE DRAWINGS

FIG. 1 is front view of a vehicle steering column embodying the invention;

FIG. 2 is a cross-sectional view taken along the plane of the line 2—2 of FIG. 1, and looking in the direction of the arrows;

FIG. 2A is a cross-sectional view taken along the plane of the line 2A—2A of FIG. 2, and looking in the direction of the arrows;

FIG. 5 is a cross-section view taken along the plane of the line 5—5 of FIG. 2, and looking in the direction of the arrows;

FIG. 6 is a cross-sectional view taken along the plane of the line 6—6 of FIG. 3, and looking in the direction of the arrows;

FIGS. 7A, 7B and 7C are views illustrating components of FIGS. 2 and 3 in different operational positions; and FIGS. 8 and 9 are cross-sectional views taken along the planes of the line 8—8 and 9—9 of FIG. 4, respectively, and looking in the directions of the arrows.

BEST MODE OF CARRYING OUT THE INVENTION

Figure 3:
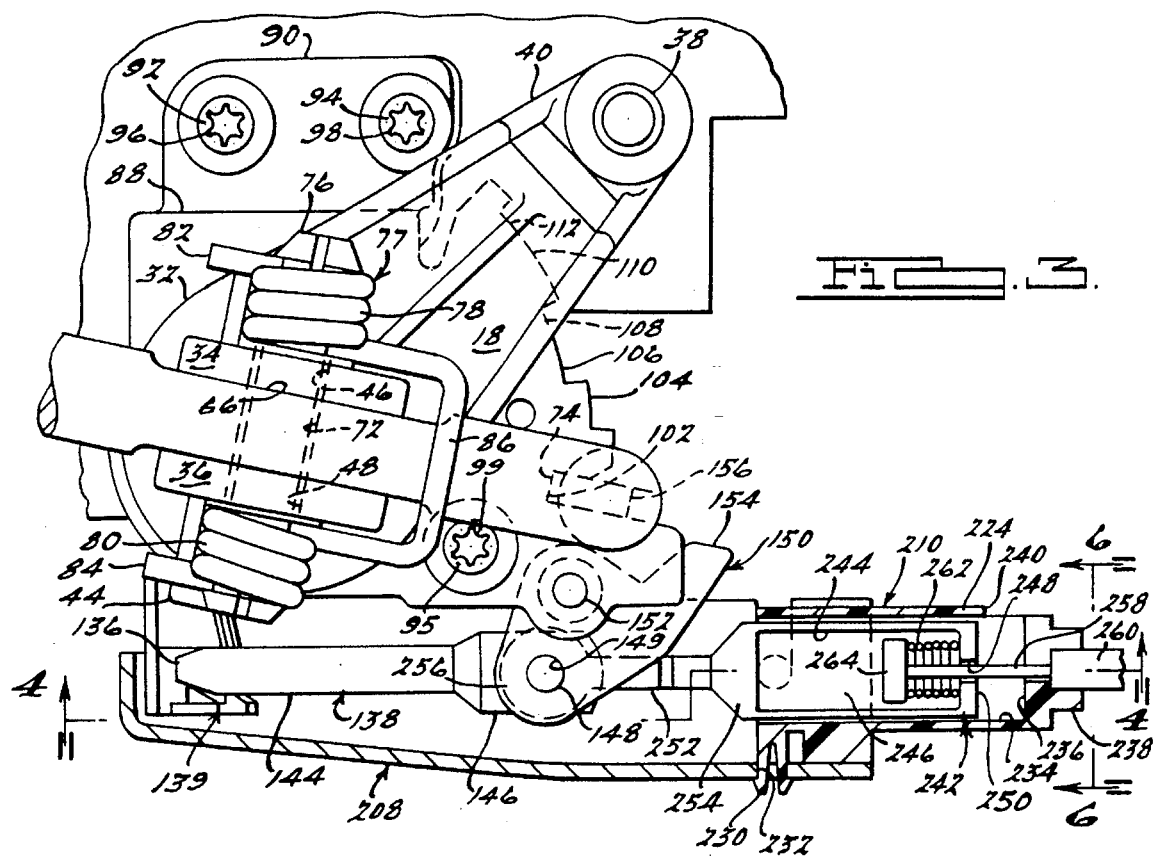
FIG. 3 is an enlarged end view of a portion of the FIG. 1 structure, as viewed in the direction of the arrow in FIG. 1.
Figure 4:
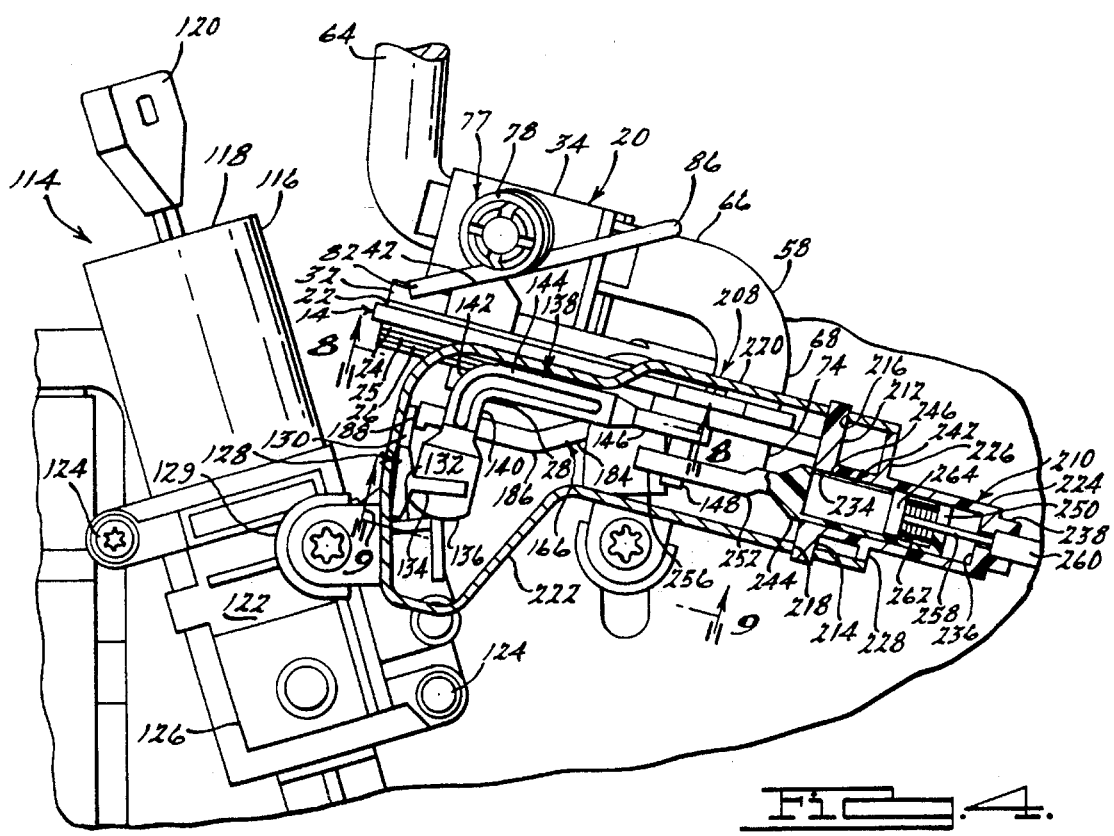
FIG. 4 is a cross-sectional view taken along the plane of the line 4—4 of FIG. 3, and looking in the direction of the arrows.

Referring now to the drawings in greater detail, FIGS. 1–7 illustrate a vehicle gear shift mechanism 10 mounted on a predetermined surface 12 of a steering column 13 (FIG. 1). The gear shift mechanism 10 includes an integral gate and mounting bracket 14 (FIGS. 8 and 9) having a mounting opening (not shown) formed in a planar body portion 18, and mounted around a cylindrical hub 19 extending from a shift lever unit 20. As shown in FIG. 4, the planar body portion 18 is confined between two wear washers 22 and 24. A wave washer 25 is confined between the wear washer 24 and a flat steel washer 26. The planar body portion 18 is retained on the hub 19 by the washer 24/25/26 arrangement which, in turn, are retained on the hub 19 by an attaching screw 28 (FIG. 8), and anti-rotational holes 29 and cooperating projections 30 formed on the shift lever unit 20.

The wear bushing 22 abuts against a partially round body portion 32 of the shift lever unit 20. A pair of spaced-apart mounting flanges 34 and 36 (FIG. 3) are formed on the body portion 32, on the side opposite the wear bushing 22 (FIG. 4), so as to extend perpendicularly therefrom.

A shift cable mounting lug 38 (FIG. 3) is provided adjacent the end of an elongated extension 40 of the body portion 32. A pair of spring retainer abutments 42 (FIG. 4) and 44 (FIG. 3) are formed on the body portion 32, extending outwardly from the respective flanges 34 and 36. A pair of aligned openings 46 and 48 are formed through a central portion of the respective flanges 34 and 36.

A shift lever 50 (FIG. 1) includes bend portions 52, 54, 56, and 58 formed along its length to provide segments 60, 62, 64, 66, and 68. A hand grip 70 is provided on the first end segment 60, and a hole 72 is formed through the segment 66. A flat-sided terminal end 74 (FIG. 4) is formed on the distal end of the segment 68, for a purpose to be described.

A spring mounting pin 76 (FIG. 3) is extended through the opening 46, the hole 72, and the opening 48. A spring assembly 77 (FIG. 3) includes a pair of coil springs 78 and 80 mounted around the respective extended ends of the pin 76. An outer end coil 82 and 84 of the respective coil springs 78 and 80 is straightened to abut against the respective spring retainer abutments 42 (FIG. 4) and 44 (FIG. 3), and a central U-shaped wire portion 86 extends from the respective inner coils of the springs 78 and 80. The U-shaped wire portion 86 (FIG. 3) is urged in tension against the outer surface of the shift handle segment 66 (FIG. 4) by the abutting outer straightened coils 82 and 84 (FIG. 3), for a purpose to be described.

The integral gate and mounting bracket 14 is formed to include a segment 88 (FIG. 3) bent outwardly from the planar body portion 18, with a mounting flange 90 bent substantially perpendicularly from the outer end of the segment 88. A pair of mounting holes 92 and 94 are formed through the flange 90, and a third hole 95 through the planar body portion 18. A pair of metal screws 96 and 98 (FIG. 1) are mounted through the holes 92 and 94 and a screw 99 (FIG. 3) is mounted through the hole 95 to secure the gear shift mechanism 10 to a mounting block 100 (FIG. 1) on the steering column 13.

A plurality of gate detents 102, 104, 106, 108, 110, and 112 (FIG. 3), corresponding to Park, Reverse, Neutral, Drive, Second and Low gear shift positions, respectively, are formed on an edge of the planar body portion 18 of the gate and mounting bracket 14.

As shown in FIG. 3, the flat terminal end 74 of the shift handle 50 is adapted to extend through the Park detent 102, being retained thereagainst by the force of the central U-shaped wire portion 86 of the spring assembly 77.

As shown in FIG. 4, an interlock latching mechanism 114 includes a cylindrical housing 116 enclosing a key cylinder 118, into which a key 120 is inserted and adapted to rotate the key cylinder within the housing 116. A cover 122 is secured by fasteners 124 over a housing 126 adjacent the inner end of the key cylinder 118.

A spring-loaded flip cam 128 is pivotally mounted in the housing 126 beneath the cover 122. A projection 130 of the flip cam 128 extends through an opening 132 and urged upwardly by a spring inside housing 129 in FIG. 4. A laterally extending extension 134 is formed on the end portion of the projection 130. An end portion 136 of a linkage rod 138 is pivotally connected by a pivot arrangement 139 shown best in FIG. 3, to the distal end of the extension 134.

The linkage rod 138 includes a first segment 140 (FIG. 4) extending from the end portion 136 to a bend 142. A second segment 144 extends from the bend 142 to a flat terminal end 146. The latter is secured by a projection 148 into an opening 149 in a blocker member 150. The blocker member 150 is pivotally mounted on a pivot pin 152 through the planar body portion 18 adjacent the Park detent 102. An extension 154 is formed on an end of the blocker member 150, adaptable to being pivoted into a slot 156 formed in an edge of the flat terminal end 74 of the shift handle 50.

A key inhibit blocker 166 is pivotally mounted at one perforated end 168 thereof by a pivot pin 170 secured to the bracket 14. A spring 172 is mounted around the pin 170, with one extended end 174 bent into a hole 176 in the blocker 166, and the other extended end 178 hooked around a fixed pin 180. The key inhibit blocker 166 is formed to include an abutment 182 adjacent the perforated end 168, a leg 184 which includes an intermediate bend 186 adapted to pass over the attaching screw 28, and a distal end 188 for a purpose to be described.

As shown in FIGS. 2–6 and 7A, B and C, a housing 208 surrounds the linkage rod 138. A plastic retainer 210 is formed to include oppositely disposed solid round projections 212 and 214 (FIG. 4) extend into respective slots 216 and 218 formed in opposite walls 220 and 222 of the housing 208, with the body 224 of the retainer 210 extending out of the end of the housing 208. Flanges 226 and 228 are formed on the body 224 to abut against the inner surfaces of the walls 220 and 222 to fixedly align the retainer 210 in the housing 208. A flexible bifurcated extension 230 (FIG. 3) is formed adjacent the inner end of the retainer 210, adapted to snap into an opening 232 formed in the housing 208 to further secure the retainer 210 therein. An axial rectangular opening 234 is formed in the body 224 from the inner end thereof to a wall 236 at the outer end of the body 224. A cylindrical projection 238 extends from the end wall 236. A radial slot 240 (FIG. 6) is formed in the projection 238 and the wall 236.

A connector member 242 includes a box portion 244 with an open side 246 and a slot 248 (FIG. 6) formed in one end wall 250 thereof. A stem 252 extends from the other end wall 254 of the box portion 244, terminating in a washer-like end 256. The latter is connected around the projection 148 (FIGS. 3 and 4).

A brake cable 258 mounted through a sheath 260 extends through the slots 240 and 248 of the retainer 210 and connector member 242, respectively, into the box portion 244. A coil spring 262 is mounted around the cable 258 in the box portion 244 between the end wall 250 and an abutment 264 formed on the end of the cable 258.

The brake cable 258 extends to a bracket 266 (FIGS. 2 and 7A, B and C) secured in any suitable manner to a brake housing 268 (FIG. 2). A spring-loaded brake lever 270 (FIG. 1) is pivotally mounted at the inner end thereof in the housing 268. A brake pedal 272 is secured to the outer end of the lever 270. A flange 274 (FIGS. 1, 7A and 7B) is secured to a predetermined intermediate point along the lever 270.

An actuator member 276 is pivotally mounted on a pivot pin 278 in the bracket 266. The actuator member 276 is formed at one end thereof to include a cable-receiving slot 280, with a side opening 282 communicating with the slot 280. The brake cable 258 extends through a slot 282' formed in an edge of a flange 283 on the bracket 266, and into the slot 280 to be retained by a ball 284 on the end of the cable 258 in the side opening 282.

An annular recess 286 (FIG. 5) is formed in a side of the member 276 concentric with the pivot pin 278. A coil spring 288 is mounted in the annular recess 286, with an inner bent end 290 (FIGS. 7A, B and C) fixed in an opening 292 formed in the member 276, and an extended outer bent end 294 (FIGS. 2, 7A, B and C) fixed in an opening 296 formed in the bracket 266. An abutment 297 is formed on a side of the member 276. A solid pin extension 298 is formed on a side of the member 276 adjacent the end thereof opposite the cable receiving slot 280.

A linkage member 300 is formed to include a perforated end 302 mounted on the pin extension 298. The linkage member 300 is slidably mounted through an opening 304 formed in a retainer 306. The retainer 306 includes a bifurcated end 308 (FIG. 2) adapted to snap fit into an opening 310 (FIG. 2A) formed in the bracket 266.

The flange 274 on the brake lever 270 is adapted to intermittently abut (FIGS. 7A and 7B) against the distal end 312 of the linkage member 300 for a purpose to be described. When the braker level 270 is not depressed, a spring 320 urges the brake level to a position in which flange 274 abuts linkage member 300.

In operation, so long as the brake pedal 272 is not depressed, the flange 274 on the brake lever 270 remains in engagement with the end 312 of the linkage member 300, thereby pivoting the actuator member 276 into the position shown in FIG. 7B. As shown, the spring 262 is partially compressed, pulling on the blocker member 150 about pivot pin 152, causing the blocker member to pivot in a counterclockwise direction in FIG. 7B, to thereby retain the extension 154 of the blocker member in the slot 156 (FIG. 9) formed in the flat-sided terminal end 74 of the shift handle 50 when the terminal end 74 is in the Park detent 102. As such, the end 74 of the shift lever 270 is blocked from being pivoted out of the Park detent 102.

Once the brake pedal 272 and lever 270 are depressed, the flange 274 departs from the end 312 of the linkage member 300, allowing the spring 288 to pivot the actuator member 276 in a counterclockwise direction to bring the abutment 297 into engagement with the flange 283 of the bracket 266. As a result, the cable 258 load is released, allowing the spring 262 to extend (FIG. 7C), thereby freeing the pull on the blocker member 150 and, hence, freeing the terminal end 74 of the shift handle 50. Thereafter, the usual ignition interlock mechanism is now free to be operated as described in Snell et al U.S. Pat. No. 5,299,470, relative to the embodiment of FIGS. 8–12 thereof.

Specifically, while the brake pedal 272 is depressed, with the key 120 in the Park mode, the blocker member 150 serves to prevent the shift lever terminal end 74 from being shifted out of the Park detent 102 by virtue of the position of the flip cam 128 holding the lateral extension 134 thereof so as to push the linkage rod 138 to the left in FIG. 9, thereby pivoting the extension 154 of the blocker member 150 upwardly into engagement with the slot 156 in the shift handle terminal end 74. When the key 120 is turned out of its Park position, the lateral extension 134 is lifted and linkage rod 138 is moved to the right in FIG. 9, pivoting the blocker member 150 and pulling the extension 154 thereof away from the shift handle terminal end 74, thus freeing the shift handle 50 for movement into any other selected detent 104–112.

Under the prior arrangement also, so long as the shift lever 50 is out of the Park detent 102, the key inhibit blocker 166 is pivoted by the spring 172 (FIG. 9) to a position wherein the end 188 thereof is pivoted to a position beneath the projection 130 so as to block any downward movement of the lateral extension 134 of the flip cam 128, thereby preventing the key 120 from being returned to its Park position. Hence, the key 120 cannot be removed from the key cylinder 118 until the shift lever terminal end 74 is once again returned to the Park detent 102, during which motion the terminal end 74 engages the abutment 182 (FIG. 9) of the key inhibit blocker 166 and pivots the latter, against the force of the spring 172, away from the downward path of the lateral extension 134 of the flip cam 128 (FIG. 4). Thus, the key 120 can be returned to Park and removed from the cylinder 118.

While the upper end 188 of the key inhibit blocker 166 is beneath the projection 130 (FIG. 4) of the flip cam 128, the blocker member 150 is held away from the Park detent 102 by virtue of the linkage rod 138 being moved to the left in FIG. 9, as just described. As such, with the brake pedal 272 not depressed, the spring 262 is compressed, as shown in FIG. 7A, by virtue of the connector member 242 and its box portion 244 being pulled to the left in FIG. 7A. The blocker member 150 is prevented from being in the path of the shift lever terminal end 74 while it is being returned to the Park detent 102 position. It is after the key inhibit blocker 166 is pivoted, as described above, by the returning terminal end 74 that the spring 262 is thereafter able to pivot the blocker member 150 (FIG. 7B) into the slot 156 (FIG. 9) in the terminal end 74, overcoming the spring 129 force in the housing 126 on the flip cam 128, even before the key 120 is returned to Park, to urge the linkage rod 138 to the left in FIG. 9 and the blocker member extension 154 in the clockwise direction (FIG. 9) in the usual manner.

Industrial Applicability

It should be apparent that the invention provides a compact and efficient mechanical brake interlock mechanism which cooperates with and is readily adapted to an ignition interlock mechanism to prevent the shift handle's terminal end portion from being lifted out of and pivoted away from the usual Park detent position to other desired transmission shift positions until the vehicle's brake pedal is depressed by the operator.

It should be further apparent that the use of the compression spring 262 arrangement provides the three operational positions shown in FIGS. 7A (brake not depressed), 7B (brake not depressed), and 7C (brake depressed).

While but one embodiment of the invention has been shown and described, other modifications thereof are possible within the scope of the following claims.

What is claimed is:

1. In a transmission shift control assembly including a detent plate having a plurality of detents formed thereon including a Park detent, a shift lever having an end thereof pivotable into and out of the Park detent and rotatable to selected detents, a pivotally mounted spring-loaded flip cam, a blocker member pivotally mounted on said detent plate, a linkage member operatively connected between said flip cam and said blocker member adapted to selectively pivot said blocker member into and out of engagement with the end of the shift lever while the shift lever is in the Park detent position, a brake lever and associated brake pedal, and a spring for urging the brake lever from a depressed state to an undepressed state, a mechanical brake interlock system comprising spring-loaded cable means operatively connected between an actuator assembly and said blocker member, said brake lever abutting against said actuator assembly to prevent said blocker member from being pivoted away from said end of said shift lever until said brake pedal is depressed and released from said actuator assembly, said spring-loaded cable means including a fixed retainer member having an opening in one end thereof and a cable-receiving slot formed in the other end thereof, a spring-loaded connector member slidably mounted in said retainer member and having a stem pivotally connected to said blocker, a cable operatively connected between said spring-loaded connector member and said actuator assembly, said actuator assembly including a bracket, an actuator member pivotally mounted via a pivot pin on said bracket, a cable-receiving slot formed on one end of said actuator member, a cable having one end secured in said slot, a pin extension formed on the end of said actuator member opposite said one end thereof, an annular groove formed in said actuator member around said pivot pin, a coil spring mounted in said annular groove and having one end thereof secured to said actuator member and the other end thereof secured to said bracket, and a linkabe member pivotally mounted on said pin extension, said brake lever serving when said brake pedal is not depressed to abut against said last mentioned linkage member to thereby pivot said actuator member against the force of said coil spring to pull on said cable and in turn, pivot said blocker member.

2. In a transmission shift control assembly including a detent plate having a plurality of detents formed thereon including a Park detent, a shift lever having an end thereof pivotable into and out of the Park detent and rotatable to selected detents, a pivotally mounted spring-loaded flip cam, a blocker member pivotally mounted on said detent plate, a linkage member operatively connected between said flip cam and said blocker member adapted to selectively pivot said blocker member into and out of engagement with the end of the shift lever while the shift lever is in the Park detent position, a brake lever and associated brake pedal, and a spring for urging the brake lever from a depressed state to an undepressed state, a mechanical brake interlock system comprising spring-loaded cable means operatively connected between an actuator assembly and said blocker member, said brake lever abutting against said actuator assembly to prevent said blocker member from being pivoted away from said end of said shift lever until said brake pedal is depressed and released from said actuator assembly, said spring-loaded cable means including a fixed retainer member, and a spring-loaded connector member movably connected between said fixed retainer means and said blocker member, and said actuator assembly including a spring-loaded, pivotally mounted actuator member, and a linkage member connected to said actuator member and abutting said brake lever when said brake lever is in its rest position, and said cable being connected between said actuator member and said connector member.

3. The mechanical brake interlock system described in claim 2, and a fixed retainer having an opening formed therethrough for receiving and guiding said linkage member when said brake lever is depressed or released.

4. In a transmission shift control assembly including a detent plate having a plurality of detents formed thereon including a Park detent, a shift lever having an end thereof pivotable into and out of the Park detent and rotatable to selected detents, a pivotally mounted spring-loaded flip cam, a blocker member pivotally mounted on said detent plate, a linkage member operatively connected between said flip cam and said blocker member adapted to selectively pivot said blocker member into and out of engagement with the end of the shift lever while the shift lever is in the Park detent position, a brake lever and associated brake pedal, and a spring for urging the brake lever from a depressed state to an undepressed state, a mechanical brake interlock system comprising spring-loaded cable means operatively connected between an actuator assembly and said blocker member, said brake lever abutting against said actuator assembly to prevent said blocker member from being pivoted away from said end of said shift lever until said brake pedal is depressed and released from said actuator assembly, said actuator assembly including a bracket, an actuator member having first and second ends and pivotally mounted between said ends on said bracket, said cable means including a cable having one end secured to the first end of said actuator member, a second spring having one end secured to said actuator member and the other end secured to said bracket, and a link connected to the second end of said pivotally mounted actuator member, said bracket lever serving when said brake pedal is not depressed to abut against said link to thereby pivot said actuator member against the force of said second spring to pull on said cable and in turn, pivot said blocker member.

* * * * *